INTERLOCKING MEANS FOR A MULTIPROCESSOR SYSTEM

Filed Dec. 2, 1965 10 Sheets-Sheet 1

INVENTOR.
RICHARD C. RICHMOND,
HISASHI H. OGUSHI,
BY J. K. Haskell
ATTORNEY

Sept. 23, 1969 R. C. RICHMOND ET AL 3,469,239
INTERLOCKING MEANS FOR A MULTIPROCESSOR SYSTEM
Filed Dec. 2, 1965 10 Sheets-Sheet 2
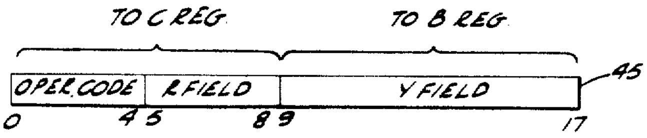
FIG. 2a
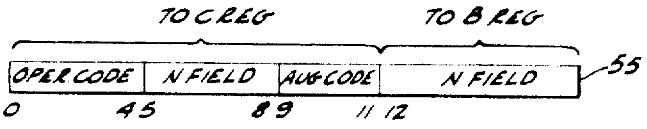
FIG. 2b
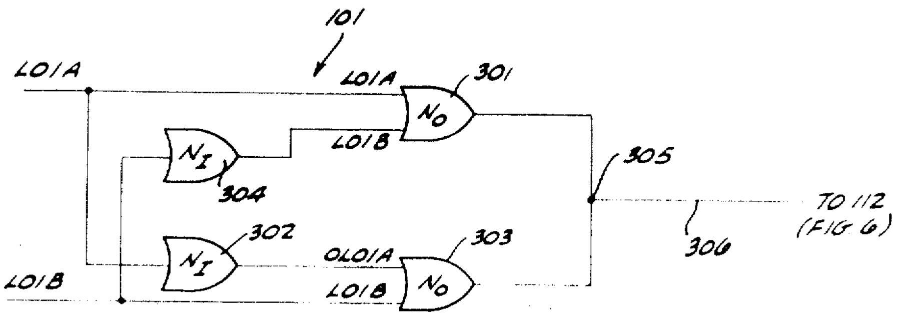
FIG. 12
| L1A | L1B | ⊕ | $\overline{\oplus}$ |
|---|---|---|---|
| 0 | 0 | 0 | 1 |
| 0 | 1 | 1 | 0 |
| 1 | 0 | 1 | 0 |
| 1 | 1 | 0 | 1 |
FIG. 13

| INSTR. NUMBER | INSTRUCTION WORD FORMAT | FIELD VALUE | INSTRUCTION |
|---|---|---|---|
| W | 14 \| N \| 4 \| N (bits 0 4 8 9 11 12 17) | $N=C_D$ | LOCK CODE NUMBER $C_D$ IN L REG |
| W+1 | 00 \| R \| Y | R+Y=W | TRANSFER BACK TO ADDRESS W |
| W+2 | 20 \| R \| Y | R+Y=X | LOAD IN P1 DATA AT ADDRESS X |
| W+3 | 22 \| R \| Y | $R+Y=F_A$ | ADD +1 TO DATA PREVIOUSLY TRANSFERRED TO P1 |
| W+4 | 26 \| R \| Y | R+Y=X | STORE IN MEMORY AT X DATA ADDED IN P1 IE D+1 |
| W+5 | 14 \| 0 \| 0 \| 0 | FIELD=0 | UNLOCK L REG OF P1 |

FIG. 3

| INSTR. NUMBER | INSTRUCTION WORD FORMAT | FIELD VALUE | INSTRUCTION |
|---|---|---|---|
| Z | 14 \| N \| 4 \| N | $N=C_D$ | LOCK CODE NUMBER $C_D$ |
| Z+1 | 00 \| R \| Y | R+Y=Z | TRANSFER BACK TO ADDRESS Z |
| Z+2 | 20 \| R \| Y | R+Y=X | LOAD IN P2 DATA AT ADDRESS X |
| Z+3 | 23 \| R \| Y | $R+Y=F_S$ | SUBTRACT 2 FROM DATA PREVIOUSLY TRANSFERRED TO P2 |
| Z+4 | 26 \| R \| Y | R+Y=X | STORE IN MEMORY AT X DATA FROM P2 |
| Z+5 | 14 \| 0 \| 0 \| 0 | FIELD=0 | UNLOCK L REG OF P2 |

FIG. 4

INTERLOCKING MEANS FOR A MULTIPROCESSOR SYSTEM

United States Patent Office 3,469,239

Patented Sept. 23, 1969

3,469,239

INTERLOCKING MEANS FOR A MULTI-PROCESSOR SYSTEM

Richard C. Richmond, Orange, and Hisashi H. Ogushi, Los Angeles, Calif., assignors to Hughes Aircraft Company, Culver City, Calif., a corporation of Delaware Filed Dec. 2, 1965, Ser. No. 511,159

Int. Cl. G11b *5/00*

U.S. Cl. 340—172.5 15 Claims

ABSTRACT OF THE DISCLOSURE

A system in which each of a plurality of processors has access to a memory unit in which items of common data are stored, each item having an assigned code number. Prior to processing an item of common data, each processor transfers the code number into its lock register for comparison with the contents of the lock registers of other processors. If the comparison is positive, the processor wanting to update the data performs a predetermined routine until a subsequent comparison indicates that no other processor is operating on the common data. In response to simultaneous requests for common data, a priority control determines which processor is to update the data.

This invention relates to multiprocessor computer systems and more particularly to a system wherein a plurality of processors are interlocked to operate with a common memory unit.

Multiprocessor computer systems have been developed to provide relatively high computational speeds such as in real time processing systems, or in any system where a maximum amount of processing is desired to be performed for any period of time. When operating with a common memory unit, each processor is adapted to access the memory to receive data therefrom, which after being operated upon by the processor is restored in memory. Often some of the data located at a specific location or address in the memory may be of the type which is operable upon by more than one of the processors. That is, the data is of a type which more than one processor may attempt to operate upon it by modifying it as part of its computational operations. Under such circumstances a danger exists that more than one processor may attempt to update the same data simultaneously rather than sequentially, with the result that the effect of the updating operation performed by one of the processors is negated by the operation performed by the other processor.

For example, let it be assumed that common data A is stored in memory and that a first processor acquires such data to add a value B thereto. Let it further be assumed that while the first processor operates on A to increase it to $A+B$, a second processor acquires the data A to subtract the value C therefrom. Then it is appreciated that if the value $A+B$ is stored in memory by the first processor, when the second processor completes its operation, changing A to $A-C$ it stores it in memory at the address where $A+B$ was previously stored. Thus the final stored data is $A-C$, rather than the desired value of $A+B-C$. The loss of the effect of the computational operation of the first processor i.e. adding B to A is due to the fact that both processors operated simultaneously on the same common data, rather than being interlocked so that at any given time only one processor can update the common data. Similar problems may arise in a multiprocessor system in which each processor is capable of performing any one of a plurality of operational functions and wherein it is desired that any given operational function be performed at any given time by a single processor only.

Accordingly, it is an object of the invention to provide an improved multiprocessor system.

Another object is the provision of an improved multiprocessor computing system with a plurality of processors having access to a common memory unit in which common data is stored.

A further object is to provide a computing system in which a memory unit storing common data is accessible by a plurality of interconnected processors to control the transfer of any common data to any of them.

Still another object is to provide a system wherein a plurality of processors having access to a memory unit with common data are interlocked to prevent the loss of any meaningful updated common data.

Yet another object of the invention is the provision of a multiprocessor computing system wherein a plurality of processors each having access to a memory unit with common data are interlocked so that at any given time only one processor may update common data.

Yet a further object is the provision of means for interlocking a plurality of processors, so that at any given time a particular operational function is performed by only one processor.

Still a further object is to provide an interlocked multiprocessor computer system in which common data is stored in a memory unit to which each processor has access can be updated in only one processor at any given time, with any other processor requiring the common data during that time being operated at a standby basis until the updated common data is returned to the memory unit.

These and other objects are accomplished in a multiprocessor computer system in which each processor has access to a memory unit in which data including items of common data are stored. Items of common data or information refers to items of data which may be altered or operated upon by more than one processor. In the memory unit, each item of common data is assigned a code number which is placed in memory at a specific location or address. Then when any given processor is to perform a subroutine which requires the use of an item of common data, prior to processing the item of common data, the code number of that item is placed in a specially provided "lock register" of that particular processor. The processor then compares the contents of its lock register against the contents of the lock registers of the other processors.

If the result of the comparison is negative, i.e. none of the other lock registers contains the code number of the particular item of data, the processor continues to update the item of common data or perform the necessary operational function in accordance therewith. After completing the operation on the item of common data, the data is returned to and stored in the memory unit at its previously allocated address and the lock register of the processor is cleared until its next use.

If however the result of the comparison is positive, i.e. the code number of the particular item of common data is in the lock register of one of the other processors, it indicates that the other processor is updating or operating on the item of common data and therefore the processor wanting to update or operate on the common data must wait until the other processor completes its operation thereon. Thus, at any given time only one processor updates or operates on the particular item of common data thereby preventing the loss of significant updated data which as herebefore exemplified may result if more than one processor attempts to update the same item of common data simultaneously.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1 is a general block diagram of a multiprocessor system in accordance with the present invention;

FIGURES 2(*a*) and 2(*b*) are format diagrams of instruction words of the type used in the system of the present invention;

FIGURES 3 and 4 are two examples of programmed subroutines useful in explaining the principles of operation of the present invention;

FIGURE 12 is a block diagram of one embodiment of a gate for performing the complement of the Exclusive-Or function used in the compare circuit shown in FIGURE 6;

FIGURE 13 is a truth chart of the complement of the Exclusive-Or function; and

Figure 1:
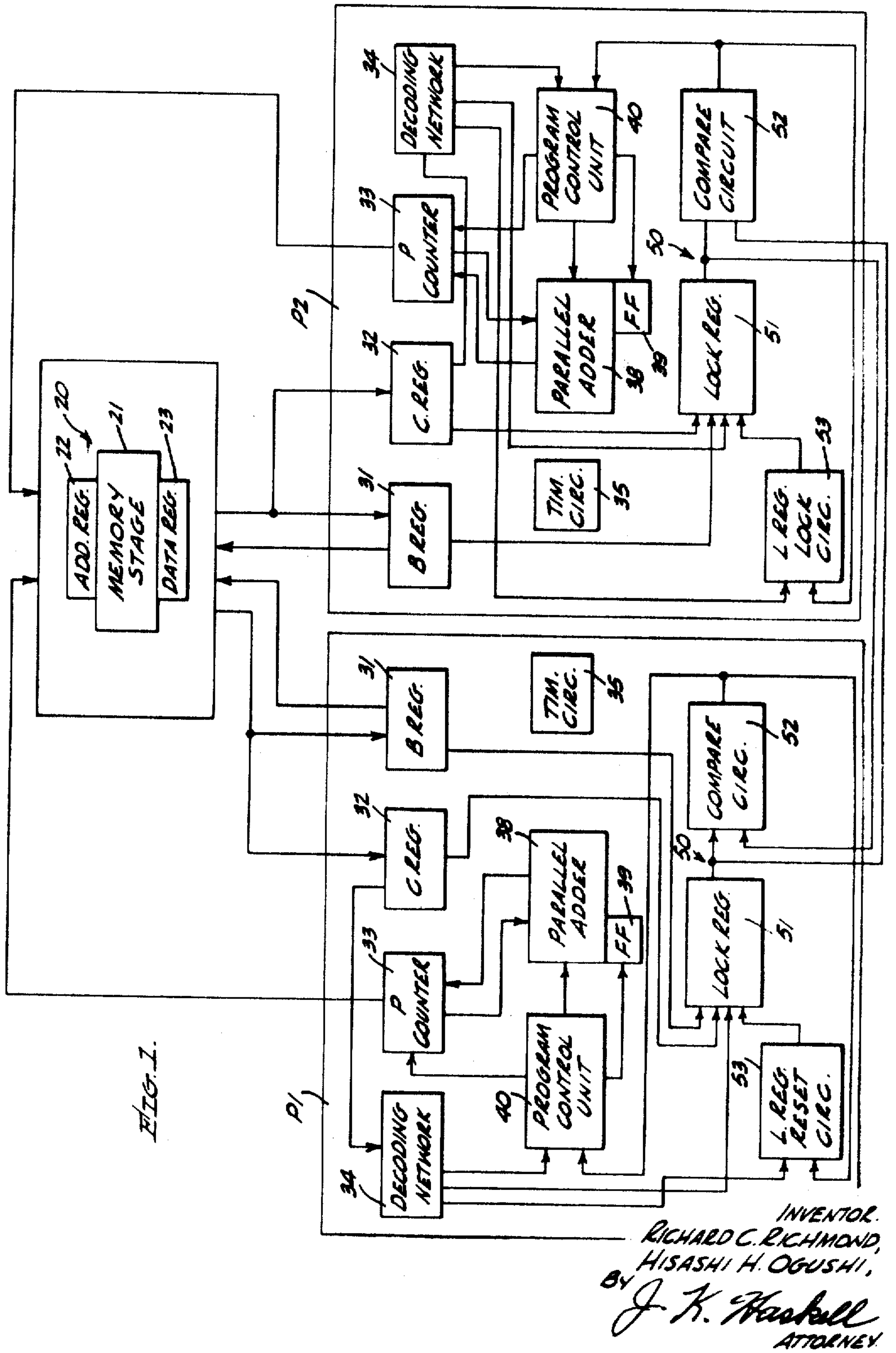

Reference is made to FIGURE 1 which is a block diagram of two processors P1 and P2 shown connected to a memory unit 20 which includes a memory stage 21, an address register 22 and a data register 23. Although only two processors are diagrammed, it is appreciated that any number of processors may be connected to memory unit 20. Processor P2 is similar to processor P1 with like numerals designating like elements. Processor P1 is shown comprising a buffer (B) register 31, a command (C) register 32 and a program counter or P counter 33. Generally the function of registers 31 and 32 is to receive data from the data register 23 of memory unit 20, with at least a part of the data received by C register 32 being decoded in a decoding network 34 to provide decoded program control signals, which as is known by those familiar in the art are used to control the various operations in the processor which also includes a timing circuit 35 to provide timing signals.

In addition, processor P1 also includes a parallel adder 38 which together with a FF 39 are connected to a program control unit 40, the function of which will be explained hereafter in detail. The operation of the circuitry of processor P1 herebefore described may best be explained in conjunction with FIGURE 2(*a*) which is one format of an instruction word 45 which may be accessed from the memory stage 21 through register 23 into the registers 31 and 32 of P1. As is appreciated by those familiar with the art, the word 45 is obtained by energizing the address register 22 with the signal in the program counter 33 which represents the address such as X of the instruction word which the processor P1 desires. As seen in FIGURE 2(*a*), the word 45 comprises 18 bits with the first five bits being used to define an operating code. Bits 5–8 define a first R field which together with the operating code are transferred to the C register, while bits 9 through 17 define a Y field which is transferred to the B register.

The code in bits 0–4 is decoded in network 34 to provide control signals used to control the processor's operation on the data in the Y and R fields stored in registers 31 and 32 respectively in conjunction with other data which may be stored in shift registers, accumulators and/or other circuitry (not shown) in the processor P1. Techniques for decoding operationg codes to control the operation of a processor on data received from a memory is well known in the art and therefore will not be described in detail. In addition to decoding the operating code, network 34 also provides a signal which is supplied to program control unit 40. The function of the latter signal is to cause the P counter 33 to transfer its content, i.e. X to the parallel adder 38 and to set FF 34 which can be thought of as a source of +1 value so that a +1 is also transferred to adder 38. Consequently its output is X+1 which after completing the operation on the last instruction word the value X+1 is transferred to the P counter 33 in order to request from the memory the next instruction word located at the address X+1.

In accordance with the teachings of the present invention, each of processors P1 and P2 include an interlocking stage 50 which may serve as an interlocking means to prevent the two processors from simultaneously accessing and updating an item of common data. Briefly the interlocking stage 50 which will hereafter be described in detail includes a lock (L) register 51 which responds to data in the B and C registers 31 and 32 and decoded signals from decoding network 34 to set register 51 to store therein the data representing a code number associated with a specific item of common data. The output of register 51 is supplied together with the output of the lock register 51 of the other processor (P2) to a compare circuit 52. The output of the compare circuit 52 is connected to the program control unit 40 and to an L-register-reset circuit 53 which when enabled resets L register 51.

Reference is now made to FIGURE 2(*b*) which is a format of a lock code number instruction word 55. As seen, it includes an operating code in the first five bits as is included in word 45 (FIGURE 2*a*). However, instead of the R and Y fields, word 55 includes N fields in bits 4–8 and 12–17 and an augmenting code in bits 9–11 which instead of being transferred to the B register 31 as in a conventional instruction word is transferred to the C register 32. The N fields define a code number of a particular item of common data. Whenever an item of common data is to be updated in P1, an instruction word such as word 55 is transferred to the B and C registers of the processor P1. Bits 0–4 and 8–11 are decoded in network 34 indicating that the instruction word is a lock-code-number word. Consequently, network 34 enables L register 51 to store bits 5–8 of C register 32 and bits 12 through 17 of B register 31 which represent the code number therein.

This code number is then compared with any code number which may be stored in register 51 of P2. If the comparison is positive, i.e. L register 51 of P2 contains the identical code indicating that P2 is operating on the specified item of common data, reset circuit 53 of P1 is activated to reset register 51 of P1. Also the compare circuit actuates unit 40 to request the next instruction word of the program. The next word may be a transfer back instruction meaning that the code of the previous instruction code number word was not attained and the transfer instruction may then shift control and cause the back instruction to again be received from the memory unit. This process could continue until the lock register 51 of P2 is cleared so that when the code number is again stored in L register of P1, a negative comparison results. When this occurs, reset circuit 53 is disabled so that the code number remains stored in L register 51. Also the output of the compare circuit 52 controls unit 40 to skip the transfer instruction and to continue the processing of common data within processor P1, as will be explained hereafter in greater detail in conjunction with a specific example.

It is appreciated that the instruction following the lock-code number instruction may be other than a transfer-back instruction. For example upon the occurrence of a positive comparison indicating that another processor is updating the specific item of common data the next instruction may reroute the processor another programmed subroutine until the specific item of common data is updated by the other processor and returned to the memory unit.

For explanatory purposes, let us assume that an item of common data D is stored in the memory unit at an address X and that a code number $C_D$ is assigned to the data D. Then in accordance with the teachings disclosed herein, in every program subroutine involving data D at X in which it is desired that data D be updated at any given time by only one of the processors, two instructions precede the instruction for transferring the data D into the processor. Referring to FIGURES 3 and 4, there are shown subroutines for processors P1 and P2 respectively. The subroutine in FIGURE 3 for P1 is to add a one (1) to the data D and the subroutine in FIGURE 4 is to subtract a two (2) from the data at X.

In each of FIGURES 3 and 4, the first column represents the instruction number or the address in the memory unit at which an instruction word having the format as shown in column 2 is located. The third column represents the value of the fields in each of the instruction words, while the fourth column is an explanation of the construction. Except for the first and last instruction words in each of the subroutines, the rest of the instruction words have a format similar to the format of the instruction word 45 in FIGURE 2(*a*) and are of a form common to the art. Namely, the first five bits are devoted to an operating code, while the other 13 bits are devoted to the two fields R and Y. The first and last instructions in each of the subroutines relate to locking and unlocking the code number in the lock register respectively. Therefore, each of the lock instruction words has a format similar to the format of instruction word 55 in FIGURE 2(*b*). Bits 0 through 4 and 9 through 11 are devoted for the operating code and augmenting code respectively, while bits 5 through 8 and 12 through 17 are devoted for the N field which represents the code number of the particular item of data.

Let us assume that at some point during the operation of processor P1, the processor has to perform the subroutine shown in FIGURE 3 which represents adding one to the data stored at address X in memory unit 20 (FIGURE 1). In order to perform the subroutine, the processor P1 is first operated to request from the memory unit the instruction word at address W. As seen in FIGURE 3, that word represents an instruction to lock the code number $C_D$ associated with the data at address X in a locked register of P1. Namely, the field N of the instruction word at address W is equal to $C_D$. When this locked instruction is received in registers B and C of P1, the bits 0 through 4 and 9 through 11 are decoded in decoding network 34 to provide an enabling signal to lock register 51 so that the field N stored in registers B and C may be stored or set into the lock register 51. Then the output of lock register 51 is compared to the compare circuit 52 with the output of the lock register 51 of processor P2.

If a positive comparison results, i.e. lock register 51 of P2 contains the code number $C_D$, thereby representing that processor P2 is operating on the data stored at address X, a signal is supplied to lock register reset circuit 53 to reset lock register 51 in P1. Then processor P1 during its normal mode of operation advances the content of the program counter 33 so that the next instruction word stored at address W+1 is requested. When the latter mentioned instruction word is received and stored in the B and C registers of P1, the code 00 of the instruction word located in the first five bits of the word is decoded to provide a transfer-back instruction to the previous address W. Namely the instruction to lock the code number $C_D$ in lock register 51 of P1 is repeated.

This operation will continue until the lock register 51 of processor P2 will be unlocked so that when the code number $C_D$ is stored in lock register 51 of P1 and a comparison is performed by the compare circuit 52, a negative comparison results. When this occurs, the lock (L) register reset circuit 53 will be disabled i.e. will not reset the lock register. Thus the code number $C_D$ will remain stored or set in register 51 of P1. The negative comparison will also energize the program control unit 40 in such a manner that the instruction word in address W+1 is skipped. That is, when a negative comparison is achieved, the value in the program counter 33 is augmented by two, so that after receiving the instruction word located at address W, the next instruction word that is required is the one located at address W+2, thereby skipping over the transfer instruction located at address W+1.

Thereafter, the processor P1 operates in a conventional mode of operation in that it receives the instruction located at address W+2 which represents a load instruction to transfer to P1 the data at address X. After this data is transferred into P1 and temporarily stored in any conventional circuit such as an accumulator or other registers (not shown), an instruction is given to provide the processor with an instruction word located at address W+3. As seen from FIGURE 3, this instruction word has a code represented by the number 22 which might indicate that a +1 should be added to the data previously transferred to P1. Namely, a 1 is to be added to the data which was transferred to P1 from address X. The next instruction is to receive the instruction word located at address W+4 which having a code 26 might indicate that the accumulated data in P1 should be stored in memory at an address defined by the sum of the fields R and Y of the instruction word which as seen from column 3 is equal to X. Thus, the accumulated value of D+1 is transferred to address X. After this instruction, the conventional subroutine is completed in that the data D previously stored at address X has been updated by adding a 1 thereto and restoring the value D+1 in address X.

However, in accordance with the teachings of the present invention, the code number $C_D$ is still set or locked in lock register 51. Thus an additional instruction is included in the subroutine to unlock the lock register of P1. This is accomplished by providing an additional instruction word which is stored at address W+5. This instruction word might have a code 14 in bits 0 through 4 representing that it is either a lock instruction or an unlock instruction. However, the augmenting code in bits 9 through 11 is a 0 so that when it is decoded in decoding network 34, it indicates that it is an unlock instruction. Also the field in bits 5 through 8 and 12 through 17 is equal to zero, further indicating that the instruction word is an unlock instruction. As a result, the decoding network provides a signal to the lock reset circuit 53 to reset or unlock the lock register 51 of P1.

Thereafter, the processor P1 is in a condition to perform any other program subroutine. If the subsequent subroutine to be performed also includes an item of common data, a similar operating process is repeated. That is, a lock instruction for locking the code number associated with such item of common data is first received to determine whether any other of the processors is operating on that item of common data. If other processors are operating on such data, the transfer instruction is then received to cause processor P1 to continue transferring back to the lock code number instruction until the other processor is finished operating or updating the item of common data.

As seen from FIGURE 4, the instruction words in both subroutines are very similar except for the fourth instruction word which in FIGURE 3 is an instruction to add a number to the data transferred to the processor, while in FIGURE 4 the instruction is to subtract a number from the data in the processor. From the foregoing, it should be appreciated that if while processor P1 performs the subroutine shown in FIGURE 3, processor P2 attempts to perform the subroutine shown in FIGURE 4, then when the instruction word located at address Z is received by processor P2 and the code number $C_D$ locked in the lock register 51 thereof, a positive comparison will result in the compare circuit thereof and therefore processor P2 will be instructed to receive the next instruction word located at address Z+1 which causes processor P2 to revert back to the instruction word located at address Z wherein the instruction to lock the code numbers $C_D$ associated with the item of common data stored at address X is located.

After processor P1 finishes updating the data, and performs the instruction of unlocking the lock register of P1, when the instruction word located at address Z is received by processor P2 an absence of comparison results and therefore the instruction word located at address Z+1 is skipped and processor P2 is then free to proceed with receiving the series of instructions located at addresses Z+2 through Z+5 and thereby perform the subroutine of subtracting the value 2 from the data previously transferred thereto from address X. However it should be pointed out that the data which processor P2 will receive will not be the value D, but rather the value D+1 which was transferred to the address X by processor P1 when performing the instruction represented by the word located at address W+4. Thus the value from which processor P2 will subtract the number 2 will be D+1, so that the final updating in processor P2 will be the value D−1 which processor P2 will store back at the address X when performing the instruction of an instruction word stored at address Z+4.

From the foregoing, it is thus seen that even though both processors are independently connected to the memory unit 20, with each one being able to access the memory to receive data therefrom and operate thereon, yet the processors are interlocked with the means to assure that only one processor can update an item of common data at any given time. And, only after that particular processor is finished with updating the data and transfers it back to its address or location in memory, can another processor receive the updated item of common data to perform additional updating operations thereon. Thus accumulative errors which may result from the simultaneous updating of an item of common data by more than one processor are eliminated.

Figure 5:
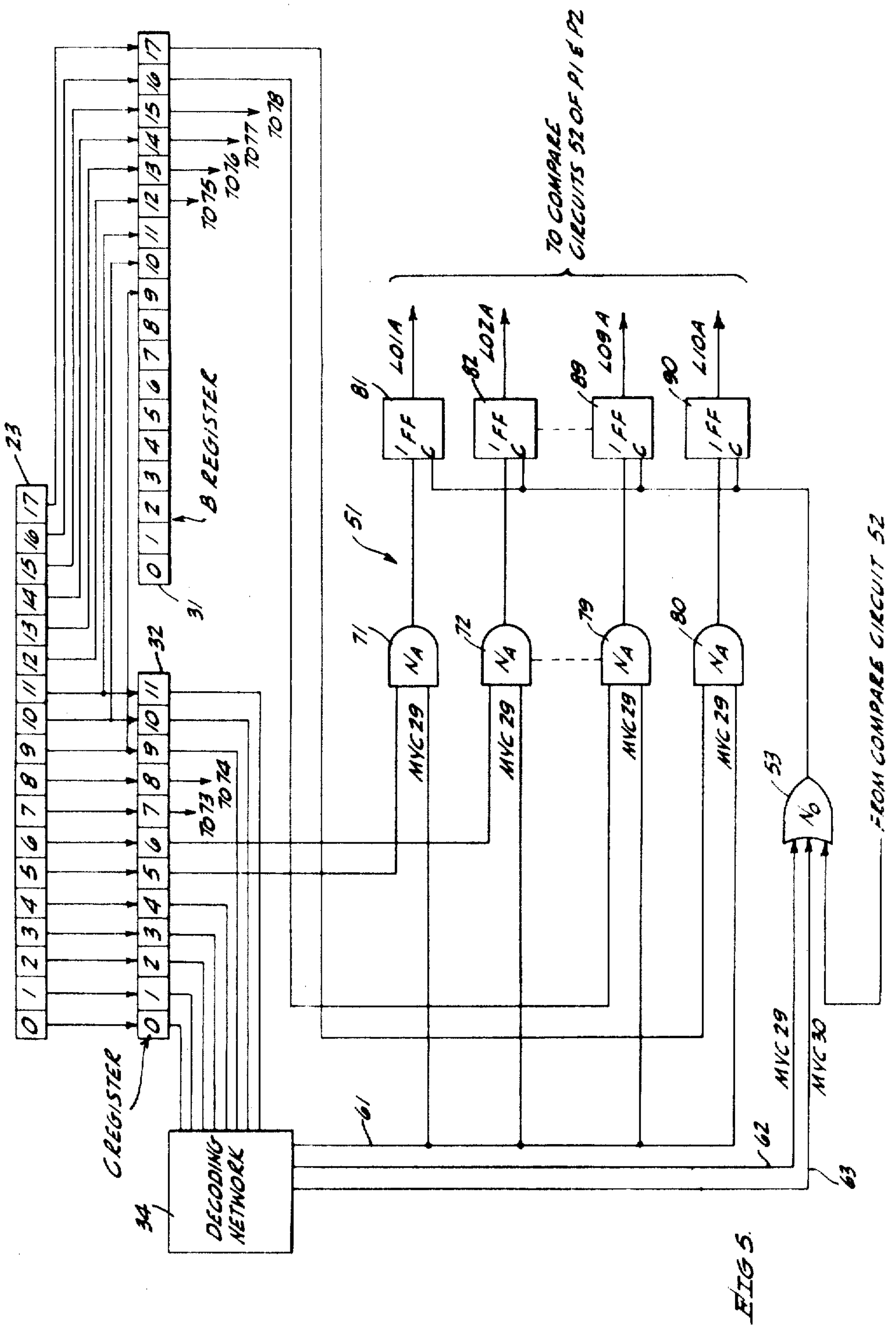
FIGURE 5 is a block diagram of a portion of each processor shown in FIGURE 1 with the lock register thereof shown in greater detail.

Reference is now made to FIGURE 5 which is a block diagram of a specific arrangement actually reduced to practice to lock a code number in lock register 51 in accordance with the teachings of the present invention herebefore explained. As seen from FIGURE 5, the data register 23 of memory unit 20 is an 18 bit register having its first nine bits 0 through 8 connected to the first nine bits 0 through 8 of the C register, which in FIGURE 5 is shown as having 12 bits. Also bits 12 through 17 of the data register 23 are connected to bits 12 through 17 of the B register 31, which in FIGURE 5 is shown as having 18 bits with only bits 9 through 17 being actually utilized. Bits 9, 10 and 11 of data register 23 are connected to bits 9, 10 and 11 of the C register, as well as to bits 9, 10 and 11 of the B register 31. Such an arrangement is necessary since the bits 9, 10 and 11 of data register 23 are sometimes supplied to the B register when the data therein is a portion of the R field as previously explained in conjunction with FIGURE 2(*a*), while at other times bits 9 through 11 of the data register 23 contain the augment code as explained in conjunction with FIGURE 2(*b*). Therefore, the bits 9, 10 and 11 of data register 23 need be connected to corresponding bits in both registers 31 and 32. The outputs of bits 0 through 4 and 9, 10 and 11 of the C register 32 are connected to the decoding network 34.

Let us assume that an instruction word received from data register 23 by registers 31 and 32 is a lock code number instruction word such as the one diagrammed in the first line of FIGURE 3. It is seen that such a word contains a code 14 in bits 0 through 4 and a code 4 in bits 9, 10 and 11. Thus when the outputs of the C register in bits 0 through 4 and 9, 10 and 11 are supplied to the decoding network 34, it provides a lock signal on an output line thereof 61 with the lock signal being designated as MYC 29. As previously explained in conjunction with FIGURE 2(*b*) and FIGURES 3 and 4, the code number of the item of common data is represented by the N field in the lock code number instruction word which is in bits 5 through 8 of the C register and 12 through 17 of the B register.

As seen from FIGURE 5, the lock register 51 includes ten NAND gates 71 through 80 with only the first two and the last two of the NAND gates being diagrammed for simplicity. Also the register includes ten flip-flops designated by numerals 81 through 90 respectively with only the first two and the last two being shown in FIGURE 5. Each of the NAND gates operates as an AND gate in that only when all the input signals thereto are true, does the gate provide a false output signal, while each of the flip-flops is set or reset as a function of the signal provided at an input terminal I when the signal provided to a control input terminal C is true. Specific embodiments of a NAND gate operating as an AND gate and a flip-flop operating as herebefore described will be diagrammed hereafter in detail.

As seen from FIGURE 5, the control input terminals of flip-flops 81 through 90 are connected to the output of a NAND gate 53 which comprises the lock register reset circuit previously described (see FIGURE 1). Gate 53 performs the Or function by providing a true output signal whenever any one of its input signals is false. One of the input terminals of NAND gate 53 is connected to the decoding network 34 to be provided therefrom on line 62 with a false signal designated OMYC 29 whenever the lock code number signal MYC 29 is supplied from network 34 on output line 61. Hereafter the letter O preceding any signal designation would indicate a false level. Thus signal MYC 29 represents a true signal while OMYC 29 represents a false signal. The lock code number signal MYC 29 is supplied to one input of each of NAND gates 71 through 80 while the other input of each of the gates is supplied to the output of another one of the bits of either the C register 32 or the B register 31.

As seen in FIGURE 5, gates 71 and 72 are connected to bits 5 and 6 respectively of the C register 32 while gates 79 and 80 are connected to bits 16 and 17 of the B register 31. Similarly, bits 7 and 8 of the C register and bits 12 through 15 of the B register are connected respectively to NAND gates 73 through 78. Thus when the outputs of bits 0 through 4 and 9, 10 and 11 of the C register 32 are decoded and codes 14 and 4 are sensed therein, the decoding network 34 provides the lock code number signal MYC 29 and its complement OMYC 29 to gates 71 through 80 and to gate 53 respectively. Consequently the content of the bits 5 through 8 of the C register 32 and bits 12 through 17 of the B register 31 are stored through the NAND gates 71 through 80 in the flip-flops 81 through 90 respectively.

Assuming for example that the code number has a value of four and that the output of flip-flop 81 represents the most significant bit while that of flip-flop 90 represents the least significant bit, it is then appreciated by those familiar with the art that after the code number four is set in the lock register 51 the outputs of all of the flip-flops 81 through 90 except the output of flip-flop 88 will be of a first level to represent a binary "0" while the output of flip-flop 88 which corresponds to the number four will be of a second level to represent a binary "1." In FIGURE 5, the outputs of flip-flops 81 through 90 are designated L01A through L10A respectively. The number indicates the flip-flop while the letter A represents that the signal is from the lock register 51 of P1.

Figure 6:
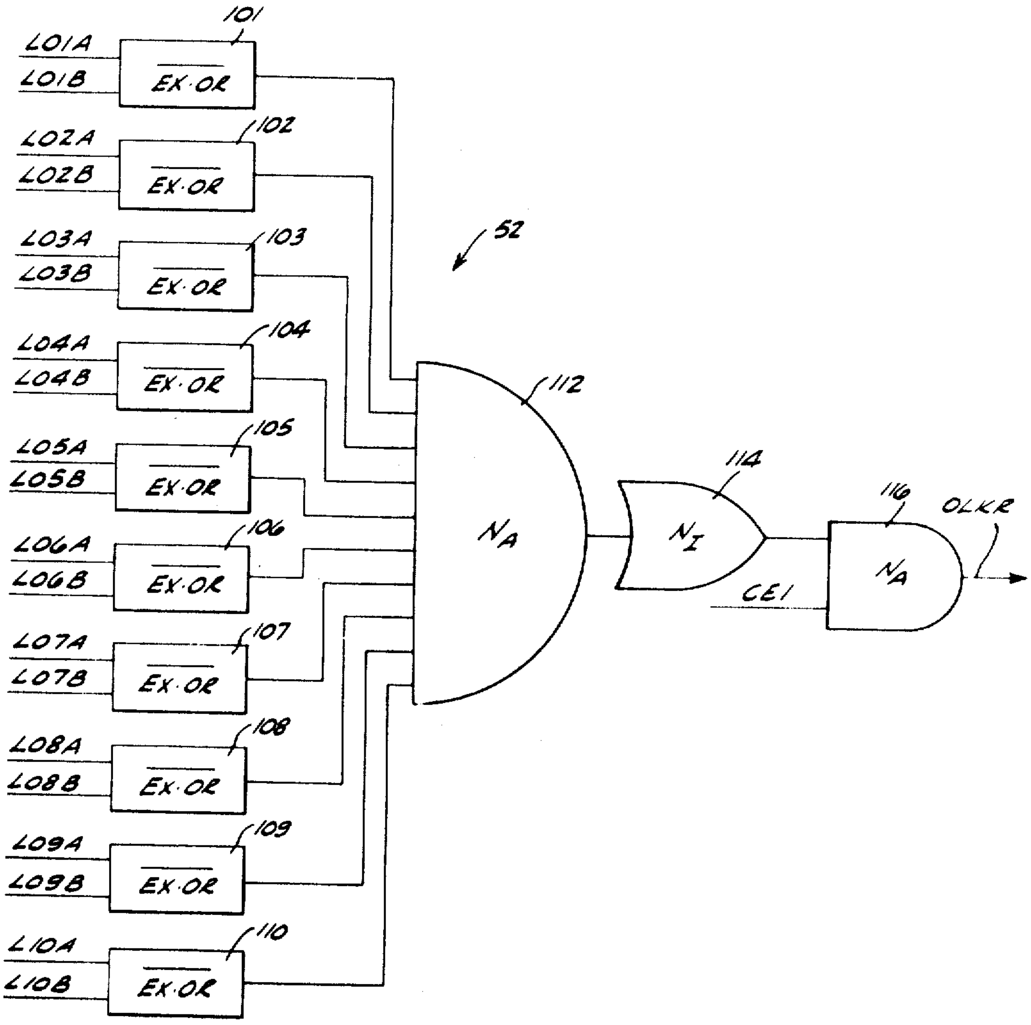
FIGURE 6 is a block diagram of the compare circuit in each processor of FIGURE 1.

The outputs L01A through L10A of flip-flops 81 through 90 are supplied to the compare circuit 52 which is diagrammed in FIGURE 6 to which reference is made herein. As seen, each of the outputs L01A through L10A is supplied to another of gates 101 through 110. Each one of the latter mentioned gates performs the complement of the Exclusive-Or function, a specific embodiment of such a gate will be described hereafter in detail. Another input to each of the gates 101 through 110 is provided from another flip-flop of the lock register 51 of processor P2, with the last letter B indicating that the signals are from lock register 51 of P1. Thus the gate 101 is provided with the outputs of flip-flop 81 of lock register 51 of P1 represented by L01A and with the output of a similar flip-flop in lock register 51 of P2 represented by L01B.

Similarly, each one of the other gates of the compare circuit 52 is provided with the output of another of the flip-flops of lock register 51 of P1. The function of each one of the gates 101 through 110 is to provide a true output only when the two signals supplied thereto are either both binary "0's" or both binary "1's." The outputs of gates 101 through 110 comprise the inputs of a NAND gate 112 functioning as an AND gate so that only when all the outputs of gates 101 through 110 are true, i.e. indicating that the numbers stored in the two lock registers 51 in the two processors are identical and that all the inputs to the NAND gate 112 are true and therefore its output is false. The output of NAND gate 112 is connected as the input to a NAND gate 114 functioning as an inverter, which produces a true output when the two numbers in the two registers are identical.

The output of gate 114 is used as one input to a NAND gate 116 functioning as an AND gate. The other input to NAND gate 116 which is supplied from the decoding network 34 is a compare enable signal CE1 which the decoding network 34 provides, simultaneously with the lock code signal MYC 29. Thus if the two numbers in the two registers are identical, both inputs to NAND gate 116 are true and therefore its output designated OLKR is false. However, if during the lock code number period, i.e. when the signal MYC 29 is supplied to NAND gate 116, the two numbers in lock registers 51 of processors P1 and P2 are not identical, one of the inputs to NAND gate 112 is false and therefore the output of NAND gate 112 is true. Consequently, the output of inverter 114 is false and therefore the output of NAND gate 116 functioning as an AND gate is true. Thus, during the lock code number period of the output of NAND gate 116 is false, it indicates that the two numbers in the two code registers are identical, while a true output during that period represents that the two numbers differ from one another.

As seen from FIGURE 5, the lock register reset circuit, represented by the NAND gate 53 operating as an OR gate is provided with the output of NAND gate 116, i.e. the signal OLKR as one of its inputs. Thus, whenever the numbers in the two lock registers 51 are identical, the signal OLKR is false and therefore the output of NAND gate 53 is true causing all of flip-flops 81 through 90 to be reset so that the code number previously supplied thereto from bits 5 through 8 of C register 32 and bits 12 through 17 of register 31 is erased therefrom.

The output of the compare circuit 52 represented by the output OLKR of NAND gate 116 is also supplied to the program control unit 40, to control the program operation of processor P1 to request the necessary subsequent instruction as previously explained. Namely, if OLKR representing the output of the compare circuit is true, indicating the absence of a comparison, processor P1 is operated to skip one of the instruction words namely the transfer instruction in order to be able to proceed to load therein the item of common data. If however the output of OLKR is false indicating a positive comparison, the processor is controlled to proceed to request the next instruction which is a transfer instruction so that the processor remains in a sense locked in a loop which causes the lock code number instruction to be supplied thereto until a negative comparison is produced by compare circuit 52.

Figure 7:
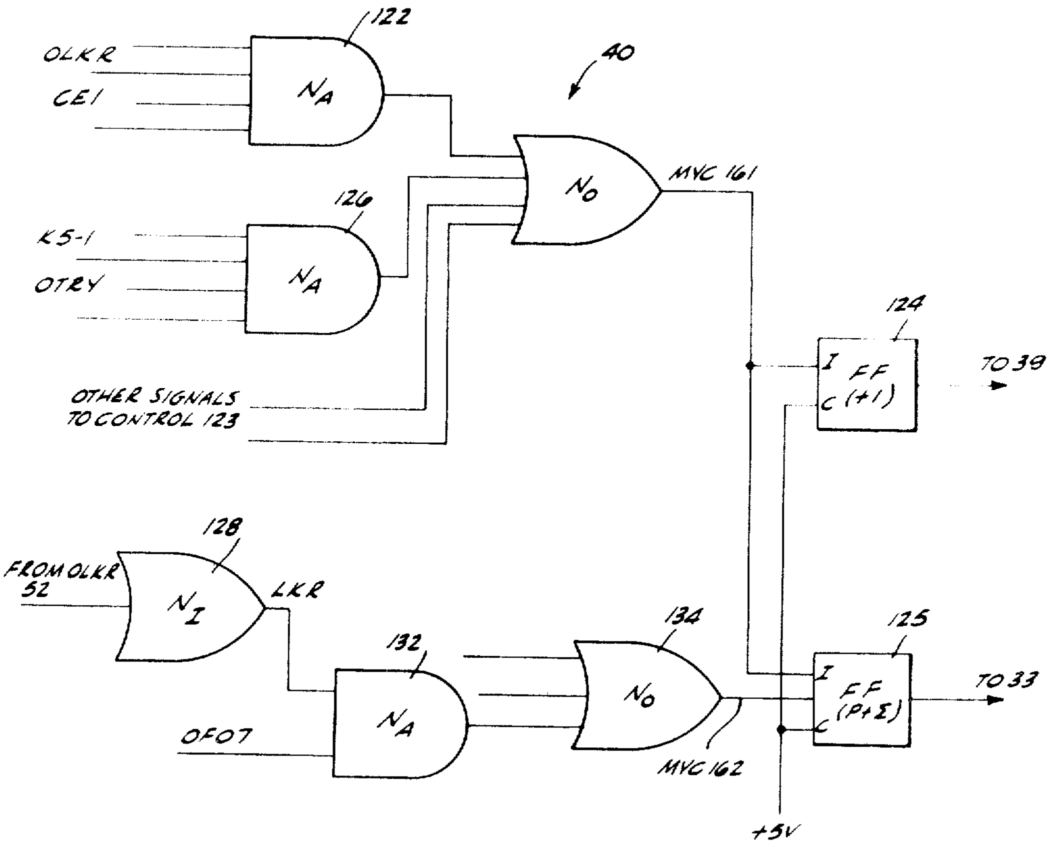
FIGURE 7 is a partial diagram of the program control unit of each processor.

For a better explanation of the mode of controlling program control unit 40, reference is made to FIGURE 7 which is a simplified diagram of the portion of the program control unit 40 necessary for the implementation of the teachings disclosed herein. As seen, the circuitry includes a NAND gate 122 having one of its inputs supplied with the signal CE1 which represents a compare enable signal, while the other input of NAND gate 122 is provided with the output OLKR of the compare circuit 52. The NAND gate 122 operates as an AND gate so that during the lock code number period when signal MYC 29 is available, only if the two code numbers in the two lock registers are different is the signal OLKR true and therefore the output of NAND gate 122 is false. The latter output is supplied as one of the inputs to a NAND gate 123 operating as an OR gate so that when the output of NAND gate 122 is false, i.e. in the absence of a comparison between the two code numbers, NAND gate 123 operating as an OR gate provides a true output signal designated in FIGURE 7 as MYC 161.

The latter signal is supplied to the information input terminals of flip-flops 124 and 125. The function of flip-flop 124 is to provide a signal to energize flip-flop 39 (see FIGURE 1) so as to transfer a +1 value to the parallel adder 38. The function of flip-flop 124 is diagrammatically represented in FIGURE 7 by the number +1 shown in parentheses in block 124. Similarly the function of flip-flop 125 is to provide a control signal to program counter 33 to transfer the content of the program counter 33 to the parallel adder 38. Similarly the function of flip-flop 125 is diagrammed in FIGURE 7 by the symbols $P\rightarrow\Sigma$ shown in parentheses.

The NAND gate 123 operating as an OR gate is also provided with additional inputs. One of the inputs comprises the output of a NAND gate 126 operating as an AND gate. Gate 126 is shown having two input terminals to which decoded signals from decoding network 34 designated as K5–1 and OTRY are supplied. Basically, the function of NAND gate 126 is to supply a false signal to NAND gate 123 in order to increase the count of program counter 33 by one in the parallel adder 38, whenever an instruction word is decoded by the decoding network except when the instruction word represents a transfer instruction word indicated by the code 00 (see FIGURES 3 and 4). Thus when a transfer instruction word is received, the signal OTRY supplied to NAND gate 126 is false and therefore the input to NAND gate 123 from NAND gate 126 is true so that the signal MYC 161 is false inhibiting it from actuating flip-flops 124 and 125 to perform their respective functions. As seen from FIGURE 7, NAND gate 123 may be supplied with additional inputs which when false cause NAND gate 123 to provide a true output MYC 161 which causes the content of program counter 33 to be augmented by one so as to request the next instruction word located at the next address in memory.

The portion of the program control unit 40 required to implement the teachings of the present invention also includes a NAND gate 128 operating as an inverter. Gate 128 has its input connected to the output of NAND gate 116 (FIGURE 6), with the output of gate 128 serving as one of the inputs of NAND gate 132 operating as an AND gate. The other input of NAND gate 132 may be provided from circuitry in processor P1 which indicates the priority of operation of P1 in relation to the priority of the other processors. Thus assuming that processor P2 rather than processor P1 has priority of operation, the input to NAND gate 132 designated as OF07 will be true. Since as hereinbefore described when a positive comparison results, i.e. the code numbers in two of the lock registers are the same, signal OLKR is false and therefore the output of NAND gate 128 designated in FIGURE 7 as LKR is true, so that both inputs to NAND gate 132 are true and therefore its output is false. The output of the latter gate (132) is supplied as one of the inputs to a NAND gate 134 operating as an OR gate so that when the output of gate 132 is false, the output of gate 134 designated as MYC 162 is true. The latter output is used as one of the inputs to the information input terminal of flip-flop 125. Thus whenever the output MYC 162 is true, flip-flop 125 is energized to control program register (FIGURE 1) 33 to transfer its content to the parallel adder 38. The purpose of this is to effect a delay of one clock time in the starting of a memory cycle so that the code number may be locked in the processor P2 having priority. This feature of the invention will be described hereafter in detail.

Figure 8:
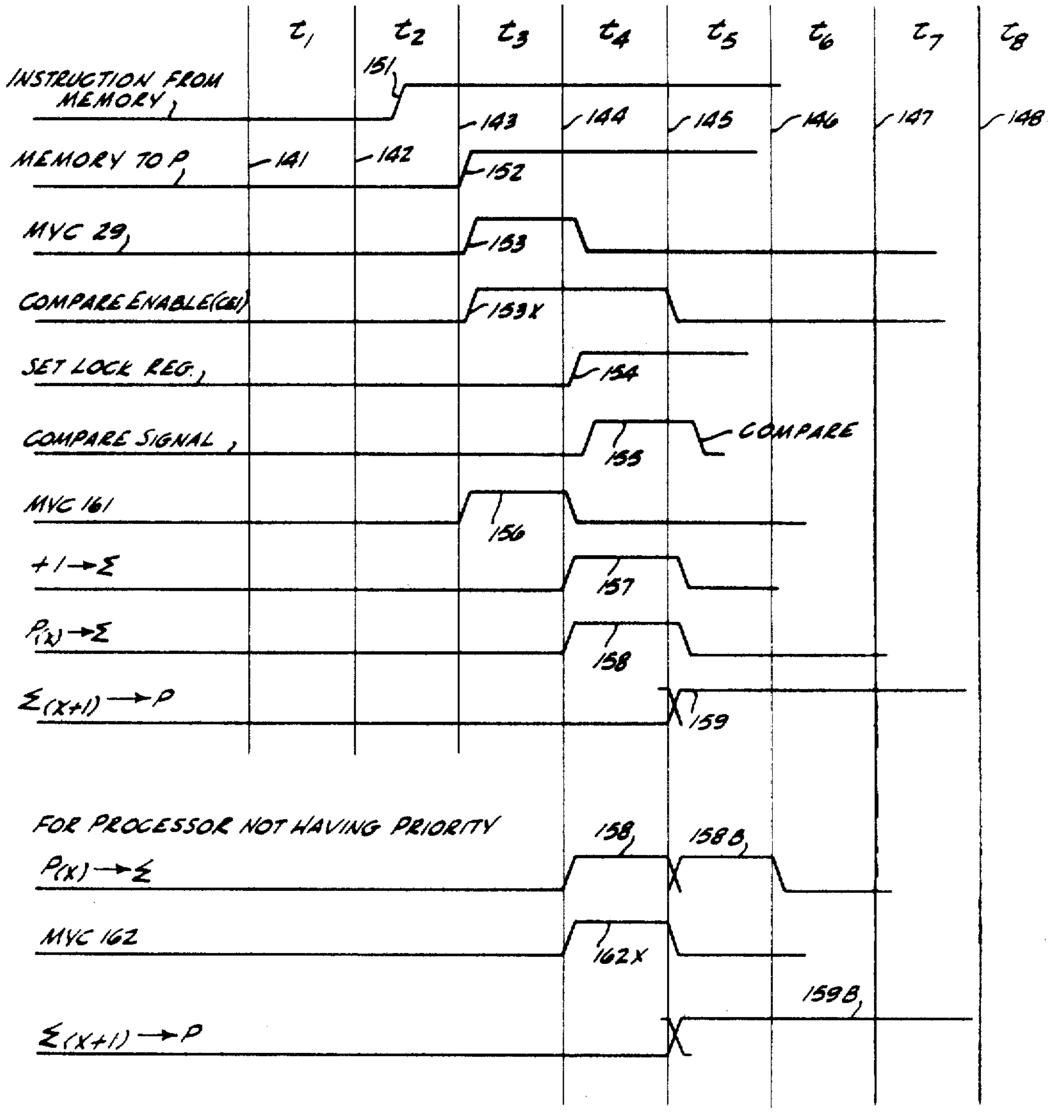
FIGURES 8 and 9 are waveform diagrams useful in explaining the operation of the interlocking means of the present invention.
Figure 9:
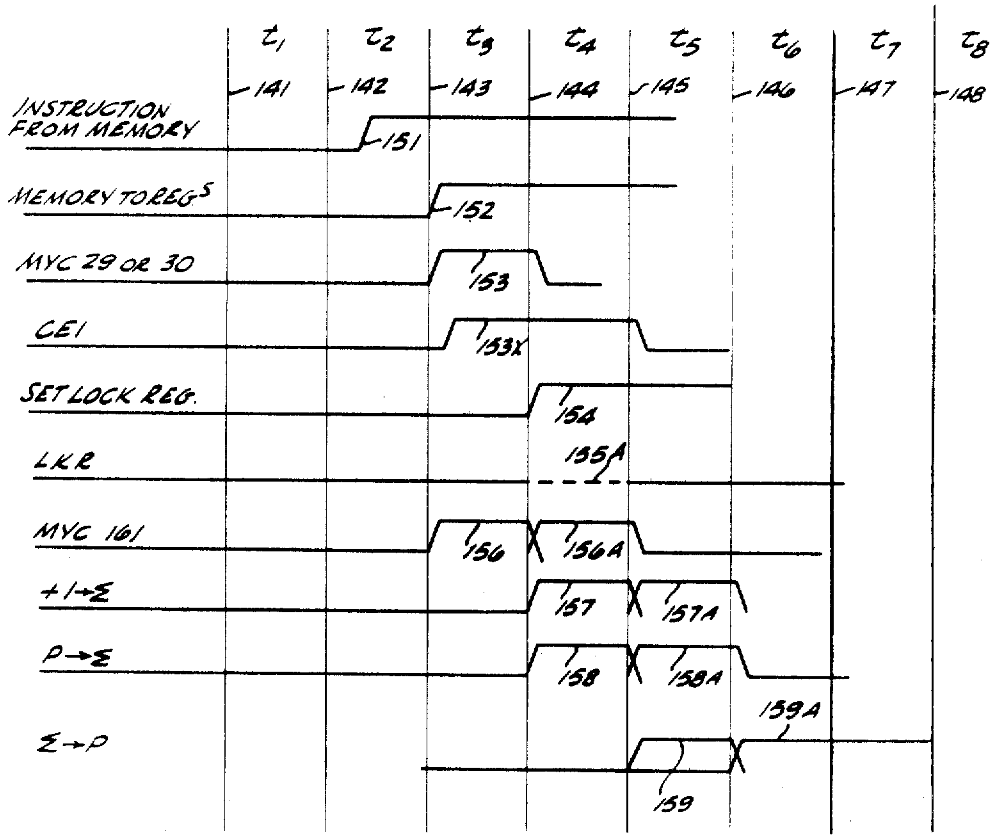

For a better understanding of the novel teachnigs of the present invention of interlocking a plurality of processors so that at any given time only one processor may be updating an item of common data, reference is made to FIGURES 8 and 9 which are waveform diagrams useful in explaining the interlocking operation hereinbefore described. In each of FIGURES 8 and 9, lines 141 through 148 designate the beginnings of time periods or intervals $t_1$ through $t_8$ respectively. These time intervals are defined by the clock pulses provided by the timing circuit 35 (see FIGURE 1) in a manner well known in the art.

Let us assume that prior to time $t_1$, processor P1 is controlled to perform the subroutine shown in FIGURE 3. As a consequence, at the beginning of time $t_1$ (line 141), processor P1 will request the instruction word located at address W. This request will be transferred to the memory unit 20 during period $t_2$ as indicated by the positive rising line 151, so that at the beginning of time interval $t_3$ (line 143), the instruction word at address W will be transferred to the B and C registers of P1 as represented by the positive rising line 152. The content of bits 0 through 4 and 9, 10 and 11 of the instruction word will as herebefore described be transferred to the C register 32 and therefrom supplied to the decoding network 34 to decode such content. As seen from FIGURE 3, the code in such bits represents a lock code number located in the field designated by N. Thus at some point during time intervalt $t_3$, the decoding network 34 will provide the lock code signal herebefore designated as MYC 29. This lock code signal is designated in FIGURE 8 by the positive pulse 153.

As seen from FIGURE 5, the lock code signal MYC 29 is provided to each of the NAND gates 71 through 80 so that at the beginning of the next time interval $t_4$ (line 144), the contents of bits 5 through 8 of C register 32 and bits 12 through 17 of B register 31 are transferred to the NAND gates 71 through 80, the outputs of which are connected to the information input of flip-flops 81 through 90 respectively. At the same time, the decoding network 34 provides on line 62 a signal designated in FIGURE 5 as OMYC 29 so that NAND gate 53 provides a true output to each of the control terminals of the flip-flops 81 through 90, thereby enabling them to be set in accordance with the output of their correponding NAND gates. Thus during the initial portion of time interval $t_4$, the flip-flops 81 through 90 which comprise the lock register 51 are set in accordance with the binary content of bits 5 through 9 of C register 32 and bits 12 through 17 of B register 31. The setting of these flip-flops or the lock register 51 is indicated in FIGURE 8 by the positive rising line 154.

Let us assume that the output of the lock register 51 of processor P1 compares positively with the output of lock register 51 of processor P2, then from the foregoing description in conjunction with the compare circuit 52 shown in FIGURE 6, it should be appreciated that if the contents of the two lock registers is the same, the NAND gate 116 provides a false output designated in FIGURE 6 as OLKR. This signal is supplied to the lock register reset circuit 53 (FIGURE 5) in order to reset flip-flops 81 through 90. The resetting of the flip-flops in a sense erases the code number previously stored therein. The false output OLKR of NAND gate 116 is designated in FIGURE 8 by the positive pulse 155.

Referring now to FIGURES 7 and 8, as seen from FIGURE 8 the compare enable signal CE1 is generated by the decoding network at the beginning of the time period $t_3$ and is indicated by line 153X. This signal is supplied to NAND gate 122 of the program control unit 40. During period $t_3$ namely before the code number is locked in lock register 51 to be compared in compare circuit 52, the signal OLKR is true. Thus, the two input signals to NAND gate 122 (FIGURE 7) are true and therefore its output is false. Consequently, the output of NAND gate 123 operating as an OR gate is true. Thus, a program controlling signal MYC 161 is generated during the beginning of time interval $t_3$. This is indicated in FIGURE 8 by the positive rising pulse 156. As seen from FIGURE 7, the signal MYC 161 is supplied to flip-flops 124 and 125 so that at the beginning of the next time interval $t_4$, designated by line 144, the two flip-flops are set. The function of flip-flop 124 is to control flip-flop 39 (FIGURE 1) to add the value +1 to the parallel adder 38. This function is indicated in FIGURE 8 by the positive rising pulse 157. Also the function of flip-flop 125 is to supply a control signal to the program counter 33 to transfer the content thereof to the parallel adder 38. This function is also diagrammed in FIGURE 8 by the positive rising pulse 158. Thus as a result of the program control signal MYC 161 the content of the program counter 33 and an additional value of +1 are transferred to the parallel adder 38 during the time interval $t_4$.

This operation occurs irrespective of the comparison of the code number stored in lock register 51 and compared in compare circuit 52. The technique of controlling the transfer of the content of a register to a parallel adder, as well as adding values such as a +1 to the adder to augment the content of the program register, is well known in the art and therefore need not be described in detail. Then, at the beginning of the time interval $t_5$, the content of the parallel adder which now represents the previous content of the program counter 33 plus a one is transferred back to the program register as indicated in FIGURE 8 by level change 159, so that during the beginning of a subsequent time interval such as $t_6$, the next instruction word, i.e. W+1 is requested in accordance with the content of the program counter 33.

As seen from FIGURE 4, when the instruction word stored in address W+1 is received by the processor P1 and decoded therein, it indicates that a transfer instruction is to cause a transfer back to address W which causes the lock code number instruction to store or lock code number $C_D$ to be repeated. The code number is again stored in a lock register 51 and a subsequent comparison is performed. If the lock register of any of the other processors such as processor P2 stores a code number $C_D$, a positive comparison, such as represented by pulse 155 in FIGURE 8, is produced resulting in the processor P1 being controlled to receive the subsequent instruction word in address W+1. Thus it should be appreciated by those familiar with the art that the processor P1 remains in a sense locked to successively operate on instruction words in addresses W, W+1, W, W+1, and so on. Namely the processor is inhibited from proceeding to receive the instruction word in address W+2 which represents the instruction to load or transfer to processor P1 the item of common data stored at address X.

Reference is now made to FIGURE 9 wherein elements similar to those shown in the previous figures are designated by like numerals. For explanatory purposes, let us assume that after code number $C_D$ is locked or set in lock register 51, and the comparison in compare circuit 52 is performed, a negative comparison signal as designated by the dashed line 155A is produced, indicating that none of the lock registers of the other processors store a code number similar to the code number $C_D$ stored in lock register 51 of P1. Then in light of the foregoing it is appreciated that the output of NAND gate 116 (see FIGURE 6) is true. Namely, the signal OLKR at the end of the comparison period is true. When this occurs, NAND gate 122 (see FIGURE 7) is again energized with two true input signals so that the output thereof is false resulting in a positive program control signal MYC 161 being produced by NAND gate 123. The latter mentioned signal is designated in FIGURE 9 by pulse 156A.

The additional MYC 161 program control signal again actuates flip-flops 124 and 125 to respectively control the flip-flop 39 and the program counter 33 to again transfer the content therein to the parallel adder 38. Thus, whereas during time interval $t_4$ flip-flop 39 provides a +1 to the parallel adder which when added to the content of the program counter 33 which is the value for the address W so that the total output of the parallel adder is W+1, due to the additional MYC 161 program control signal represented by pulse 156A, the flip-flop 39 provides an additional value of +1 as indicated by pulse 157A so that the total addition in parallel adder 38 at the end of time interval $t_5$ is W+2. This total value (W+2) indicated by pulse 159A is transferred to the program counter 33 at the beginning of the time interval $t_6$ so that during the beginning of a subsequent time interval the instruction word in address W+2 is requested by the processor.

As seen from FIGURE 3, the instruction word located at address W+2 represents a transfer or load into the processor the item of common data stored at address X. Thus, the item of common data is transferred to the processor and similarly each succeeding instruction word stored in one of the addresses W+3 through W+5 is supplied to the processor until the subroutine is completed. It should be pointed out that the instruction word in address W+5 is an unlock lock register instruction. That is represented by the code 14 in bits 0 through 4 and by the 0 code in bits 9 through 11 of the instruction word. When these codes, i.e. 14 and 0 are supplied to the decoding network 34 through C register 32, the decoding network provides on an output line 63 a false unlock signal OMYC 30 which energizes NAND gate 53 operating as an OR gate to provide a true output signal thereby resetting all of the flip-flops 81 through 90 of lock register 51 (see FIGURE 5). Thereafter, the processor is ready to resume any other subroutine which is to be performed thereby.

From the foregoing description, it should be appreciated that if in any subsequent subroutine to be performed by the processor one of the instruction words in the subroutine is to transfer an item of common data to the processor so as to operate or update the data, that particular instruction word may be preceded by two instruction words, which may control the locking of the code number associated with such data in the processor. One of them may be the lock code number instruction word such as the first word in FIGURES 3 and 4, and the other may be the transfer-back instruction word such as the one shown on the second line of each of FIGURES 3 and 4. After locking the code of the particular item of common data, a comparison operation is performed. If a positive comparison signal is produced, i.e. another one of the processors has the particular code number locked in its respective lock register, the processor will proceed to the next instruction which will be the transfer-back instruction word. If however none of the other processors has the particular code number locked therein, a negative comparison signal will be produced which in essence as herebefore described will actuate the program control unit 40 (FIGURE 1) in such a manner as to provide two successive values of +1 from flip-flop 39 to the parallel added 38 so that the subsequent instruction word located at the subsequent instruction is skipped and the processor can proceed to the instruction word to transfer or load therein the item of common data.

Although in the foregoing it has been assumed that whenever an item of common data is to be transferred to a processor it is preceded by instruction words for locking its associated code in the processor, it should be appreciated that the computer program may include subroutines to transfer items of common data without regard to the fact that other processors may be operating on such data, namely bypass the interlocking arrangement. This can easily be accomplished by not including the instruction words associated with the code numbers of such words.

A possibility exists that two processors such as P1 and P2 may simultaneously be energized to operate on two subroutines such as those shown in FIGURES 3 and 4 respectively. Namely, processor P1 may request the instruction word in address W at the same time that processor P2 requests the instruction word in address Z. As seen from FIGURES 3 and 4, the instruction words in the two addresses (W and Z) are the same. Thus, the two processors will simultaneously attempt to lock a code number $C_D$ in their respective lock register 51. Consequently, in the compare circuit 52 of each of the processors, a positive comparison signal will result which as herebefore described will cause each processor to proceed to the instruction word in the next address of its respective subroutine which is a transfer-back instruction word (see second line in each of FIGURES 3 and 4). The transfer-back will again cause the two processors to simultaneously respond to the first instruction word in each subroutine which is a lock code number instruction. Thus the two processors may be locked in a closed loop whereby they successively operate only on the first and second instructions of their respective subrountines.

In order to prevent such closed loop locking from occurring, the teachings of the present invention provide additional circuitry for enabling the processor having priority of operation to access the memory and operate on the item of common data before a processor having a lower degree of priority has such access. For a better understanding of the technique employed to enable a processor having priority to have prior access to the item of common data, reference is again made to FIGURES 7 and 8 with particular attention being drawn to the bottom three lines of FIGURE 8 which are useful to explain the operation of the program control unit 40 in the processor which does not have priority or has a lower degree of priority. As seen in FIGURE 7, the NAND gate 132 has one input designated OF07 which as previously explained, is true in the processor having a lower degree of priority. Also, another input of NAND gate 132 is the output of a NAND gate 128 operating as an inverter on its input OLKR from the compare circuit 52. As previously explained in conjunction with FIGURES 8 and 9, the CE1 signal causes the program counter 33 to transfer its content to the parallel adder 38 as indicated by pulse 158.

When the two processors simultaneously attempt to store or lock the same code number, the output of the compare circuit OLKR will be false as herebefore described. Thus the output of the inverter 128 (FIGURE 7) will be true. Also in the processor not having priority, the signal OF07 will also be true and therefore the output of NAND gate 132 operating as an AND gate will be false. Since the output of gate 132 is supplied as an input to a NAND gate 134 operating as an OR gate when the output of gate 132 is false, the output of gate 134 represented as a second program control signal MYC 162 is true. The second control signal MYC 162 is shown in FIGURE 7 connected to the information input of flip-flop 125 so that when the second control signal MYC 162 is present, flip-flop 125 is set to control program counter 33 to again transfer its content to the parallel adder 38.

The additional transfer is indicated in FIGURE 9 by the positive pulse 158A.

On the other hand, in the processor having priority, the signal OF07 will be false and therefore the content of the program counter 33 in the processor having priority will not be transferred again to the parallel adder during the time interval $t_5$ so that the content of the parallel adder in the processor having priority will be transferred to the program counter 33 during the time interval $t_5$ to enable that particular processor at the beginning of time interval $t_6$ to request the next instruction word. However, in the processor not having priority, the transfer of the content of the P counter 33 to the parallel adder 38 during the time interval $t_6$ indicated by pulse 158B will cause a delay of one clock period. Consequently, in the processor not having priority, only at the beginning of the time interval $t_7$ represented by line 147 can the processor not having priority request the next instruction word.

From the foregoing, it is thus seen that the processor having priority is able to request the next instruction word at the beginning of time interval $t_6$ while the processor not having priority is delayed by one time interval and is able to request the next instruction word only during the beginning of a succeeding time interval $t_7$. Such an arrangement inhibits the two processors from remaining interlocked in a closed loop arrangement. It enables the processor having priority to have access to the next instruction word prior to the accessing of the processor with a lower degree of prority and thereby enable the processor with a higher degree of priority to lock the code number associated with an item of common data and operate thereon. On the other hand, the processor having a low degree of priority has to wait until the processor with the higher degree of priority finishes its operation on the item of common data and returns it to the memory. For example, assuming that processor P1 has a higher degree of priority than processor P2 and that the two processors simultaneously start performing the subroutines diagrammed in FIGURE 3 and FIGURE 4, then it should be appreciated in light of the foregoing, that processor P1 will be the first to receive the item of common data located at address X to update it by adding a one to it. Only after the updated item of common data is returned to the memory unit and the lock register 51 of processor P1 is unlocked in accordance with the instruction word stored in address W+5 can processor P2 receive the updated item of common data in address X to subtract the number two therefrom in accordance with the instruction word stored at address C+3 (see FIGURE 4).

Summarizing briefly, from the foregoing description, it is seen that in accordance with the teachings of the present invention, a plurality of processors such as P1 and P2 are interlocked so that at any given time an item of common data stored in the memory unit 20, to which either one of the processors may have access, only one of said processors may update or operate on such item of common data. If while one of the processors operates on such common data, another processor requires the common data to perform a subroutine thereof, the other or subsequent processor is inhibited from continuing to perform the subroutine until the prior processor returns or restores the updated item of common data in the memory unit. The sensing of which processor is operating or updating an item of common data is accomplished by providing each item of common data in an operational system which an associated code number which is transferred to the processor and stored in the lock register thereof before the item of common data is to be supplied to the processor. Then a comparison operation is performed to compare the contents of all of the lock registers to be sure that none of the lock registers of the other processors contains the particular code of interest thereby indicating that none of the other processors are operating on the item of common data.

Figures 10, 11:
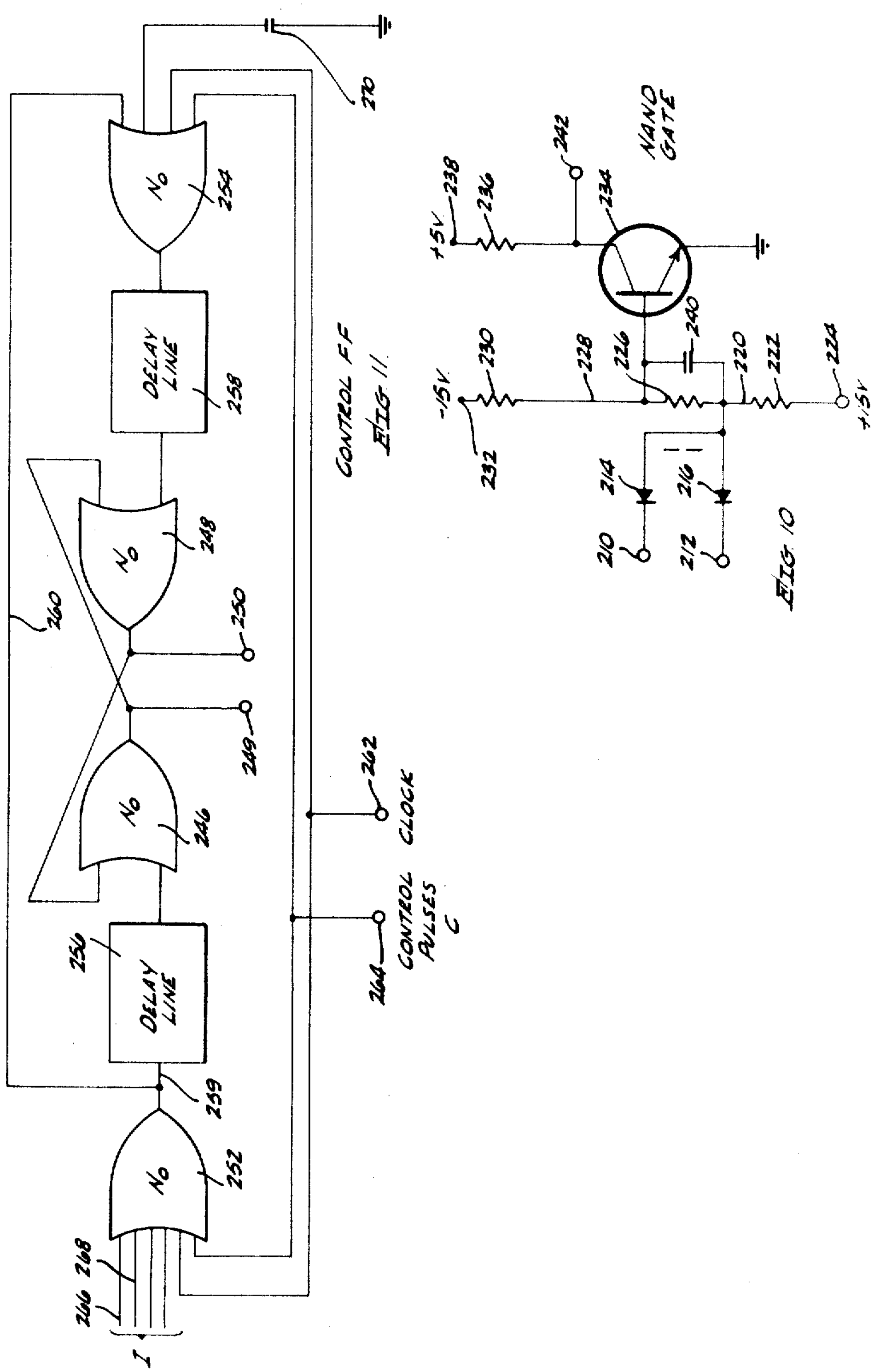
FIGURE 10 is a schematic diagram of one embodiment of a NAND gate shown in the previous figures.
FIGURE 11 is a block diagram of one embodiment of a flip-flop shown in the previous figures.

Reference is now made to FIGURE 10 which is a schematic diagram of a NAND gate which may be utilized in the system in accordance with the invention. A plurality of input terminals 210 and 212 are coupled through the cathode to anode paths of respective diodes 214 and 216 to a lead 220 which in turn is coupled through a resistor 122 to a +15 volt terminal 224. The lead 220 is also coupled through a resistor 226 to a lead 228 and in turn through a resistor 230 to a −15 volt terminal 232. The lead 228 is also coupled to the base of an NPN type transistor 234 having an emitter coupled to ground and a collector coupled through a resistor 236 to a +5 volt terminal 238. A capacitor 240 may be coupled in parallel across resistor 226 to reduce the rise time of the transistor when it is biased into conduction. An output terminal 242 of the gate is coupled to the collector of the transistor 234.

In operation, a false signal of zero volts applied to either or both of the input terminals 210 and 212 causes current to flow from the terminal 224 through the resistor 222 and through the corresponding diode or diodes so that the transistor 234 is maintained in a nonconductive state. Thus a +5 volt or true signal is provided on the output terminal 242. However, when both of the input signals applied to input terminals 210 and 212 are true or +5 volts, the diodes 214 and 216 are biased out of conduction and a positive voltage is maintained at the base of transistor 234. Thus the transistor is biased into conduction so that substantially zero volts or a false signal is provided on the output terminal 242. The NAND gate of FIGURE 10 functions as an AND gate to develop a false output signal only when all of the input signals change from false levels to true levels.

When the signals at all of the input terminals are normally maintained at true levels to provide a false signal at the output terminal 234, the gate functions as an OR gate since in response to any of the input signals going to a false level, the gate will provide a true signal at the output terminal 242. When functioning as an inverter in response to a positive going input signal (that is, with the output terminal normally at the true level) all unused input terminals of the gate of FIGURE 10 may be coupled to a +5 volt and the input signal going through at the single active input terminal causes the output signal at output terminal 242 to become false. The latter operation of the NAND gate of FIGURE 10 is similar to that performed when the gate operates as an AND circuit except that when operating as an inverter only a single one of the input terminals is being used as the active input terminal.

When the NAND gate of FIGURE 10 functions as an inverter in response to a negative going input signal (the output signal is normally false), all unused input terminals are coupled to a +5 volt level and the single active input terminal which goes false causes the output signal to become true, which is similar to the operation of the gate when functioning as an OR gate. Thus, depending on whether the gate of FIGURE 10 normally has a true output signal or a false output signal, the symbols utilized in the illustrated system are respectively that of an AND function (a gate symbol with a straight input edge) and of an OR function (a gate symbol with a concave input edge). Those NAND gates operating as AND gates are also designated by the letter N with a subscript A ($N_A$) while those NAND gates operating as OR gates are designated by the letter N and a subscript O ($N_O$) and the NAND gates operating as inverters are designated by an N with the subscript I ($N_I$). It should be appreciated that although the NAND gate of FIGURE 10 is shown as comprising two input terminals, any desired number of input terminals may be employed. Furthermore, it should be appreciated that the gate shown in FIGURE 10 is presented for explanatory purposes only and that any other gating circuits which perform the AND, OR and inverter functions may be employed.

Reference is now made to FIGURE 11, which shows a flip-flop that may be utilized in the system of the invention. NAND gates 246 and 248 are provided to function as OR gates with the output terminal of the gate 246 coupled to a false output terminal 249 as well as to the input terminal of the gate 248. The output terminal of the gate 248 is coupled to a true output terminal 150, as well as to an input terminal of the gate 246. The toggle operation of the gates 246 and 248 is controlled by NAND gates 252 and 254 functioning as OR gates and respectively coupled through delay lines 256 and 258 to input terminals of respective NAND gates 246 and 248. The output terminal of a NAND gate 252 functioning as an OR gate is coupled through leads 259 and 260 to an input terminal of NAND gate 254 functioning as an OR gate.

A source of clock pulses at a terminal 262 and a source of control pulses C at a terminal 264 are also applied to the gates 252 and 254. The informational input signals I are applied through leads such as 266 and 268 to the gate 252. For accommodating delays between the informational signals applied to the lead 260 and the clock signal, a capacitor 270 is coupled between ground and one input terminal of the gate 254. Unused input terminals to the gate 252 are coupled to a true or constant +5 volt level.

In operation, the flip-flop of FIGURE 11 is utilized with the informational input signals I on the leads such as 266 and 268 being normally true so that upon occurrence of the clock and control input signals, the signal on the lead 260 is false. The information input leads such as 266 and 268 are normally true in the absence of a coincidence condition at NAND gates (not shown) coupled thereto. The signal on the lead 259 is always true except at clock time when it becomes false to set the flip-flop to the false state if all of the informational input signals are true and the control input signal or pulse is true. However, if one of the informational signals is false at clock time, the signal on the lead 259 is true and the flip-flop is set to the true state or remains in the true state.

For example, if the flip-flop is in the false state with a true or +5 volt level signal at the terminal 249, the input signals to the gate 248 are both true, so that a false signal at the terminal 250 is applied to the gate 246 along with the normally true signal on the lead 259. When one of the informational input signals on the leads such as 266 and 268 is false at clock time, the signal remains true on the lead 259. As a result, a false signal is developed by the gate 254 so that the gate 248 develops a true output signal. The gate 246 thus develops a false signal which maintains the gate 248 developing a true signal. The signal on the lead 259 remains true after clock time so that a false output signal is maintained by the gate 246 and a true output signal by the gate 248 to provide a stable "one" or a set state for the flip-flop.

The flip-flop operates in a similar manner when previously storing a true state and the informational input signals and the control input signal are all true at clock time to change the gate 246 to a state of having a positive or true output which is the stored "zero" or reset state. The delay lines 256 and 258 provide delays of the input signals so that information may be reliably interrogated from the terminals 249 and 250 at the beginning of a clock period and new information may be written therein during the same clock period. It is to be noted that the signal at the control input terminal 264 must be true at clock time for the flip-flop to change state.

If the signal at the control input terminal 264 is false at clock time, the flip-flop remains locked in its previous state as the signal on the lead 259 remains true and the signal developed by the gate 254 remains at the true level. Also, if the signal at the control input terminal 264 is maintained or provided at a true level, the flip-flop is reset to the false state at clock time to function as a delay flip-flop if all of the informational input signals are at a true level.

Reference is now made to FIGURE 12 which is a block diagram of one of the gating arrangements such as gate 101 shown in FIGURE 6 for providing the complement of the Exclusive-Or function of two inputs designated L01A and L01B. FIGURE 13 is a truth chart or table for the Exclusive-Or function and the complement of the Exclusive-Or function of two inputs. The Exclusive-Or function is designated by ⊕ while the complement of the Exclusive-Or function is designated by $\overline{\oplus}$. As seen from FIGURE 13, the output of a gating circuit providing the complement of an Exclusive-Or function is a one, or true, only when the two inputs thereto are the same, i.e. when both inputs are zeroes, i.e. false, or ones, i.e. true.

In the present invention, the input L01A to the gating circuit 101 is actually the true output of flip-flop 81 of the control register 51 of processor P1, while the input L01B is the output of a flip-flop 81 or the lock register 51 of processor P2. The input L01A is directly supplied as one input to a NAND gate 301 functioning as an OR gate, as well as to a NAND gate 302 operating as an inverter, with the output of NAND gate 302 being supplied as one input to a NAND gate 303 functioning as an OR gate. Similarly, the input L01B is supplied to the other input of NAND gate 303 as well as to a NAND gate 304 operating as an inverter, the output of which is provided as the second input to NAND gate 301. The outputs of gates 301 and 303 are tied together at a junction point 305 which is connected by a line 306 to one of the inputs of NAND gate 112 (FIGURE 6) which forms a part of the compare circuit heretofore described.

From the foregoing, it is seen that when signals L01A and L01B are the same, whether both true or false, due to the inversion operation of NAND gates 302 and 304, one input of each of gates 301 and 303 is false. Therefore, each of gates 301 and 303 provides a true output so that the signal at junction point 305 is true. However, when L01A differs from L01B, the two inputs of gate 301 or gate 303 are both true and therefore the output of one of the gates is false. Thus, the point 305 is at a false level which when supplied to NAND gate 112 (FIGURE 6) causes gates 112 to provide a true output which indicates that at least one of the flip-flops 81 through 90 in lock register 51 stores a bit which differs from the bit stored in a corresponding flip-flop of the lock register of another processor. Only when all the inputs to NAND gate 112 (FIGURE 6) are true does the gate provide a false output which indicates that the code in register 51 of the processor positively compared with the code stored in the lock register of another processor.

Summarizing briefly, in accordance with the teachings of the present invention, an interlocked multiprocessor system is provided. In the system, each processor has access to a common memory unit to communicate therewith so as to perform various program subroutines. Some of these subroutines may include instruction words, such as the words stored in address W+2 and Z+2 (FIGURES 3 and 4), which actuate each processor to transfer thereto an item of common data D such as the one stored at address X, in order to update the item of common data. In order to prevent more than one processor from updating the common data D at the same time, in each subroutine preceding the instruction word to transfer the common data D to the processor, are included two instruction words. One word instructs the processor to lock a code $C_D$ associated with the data D and the following word instructs the processor to transfer back to the address wherein the code is stored. These two instruction words are used together with the interlocking circuitry in each processor to insure that at any given time, the code $C_D$ can only be locked in the lock register of one of the processors, so that only that processor may access the memory unit to receive the common data D and update it as part of performing its subroutine. At the end of the subroutine, the updated common data is again stored in its associated address and the lock register resets to enable any other processor to lock the code $C_D$ in its lock register and proceed to receive the updated common data in order to complete its own subroutine.

Figure 14:
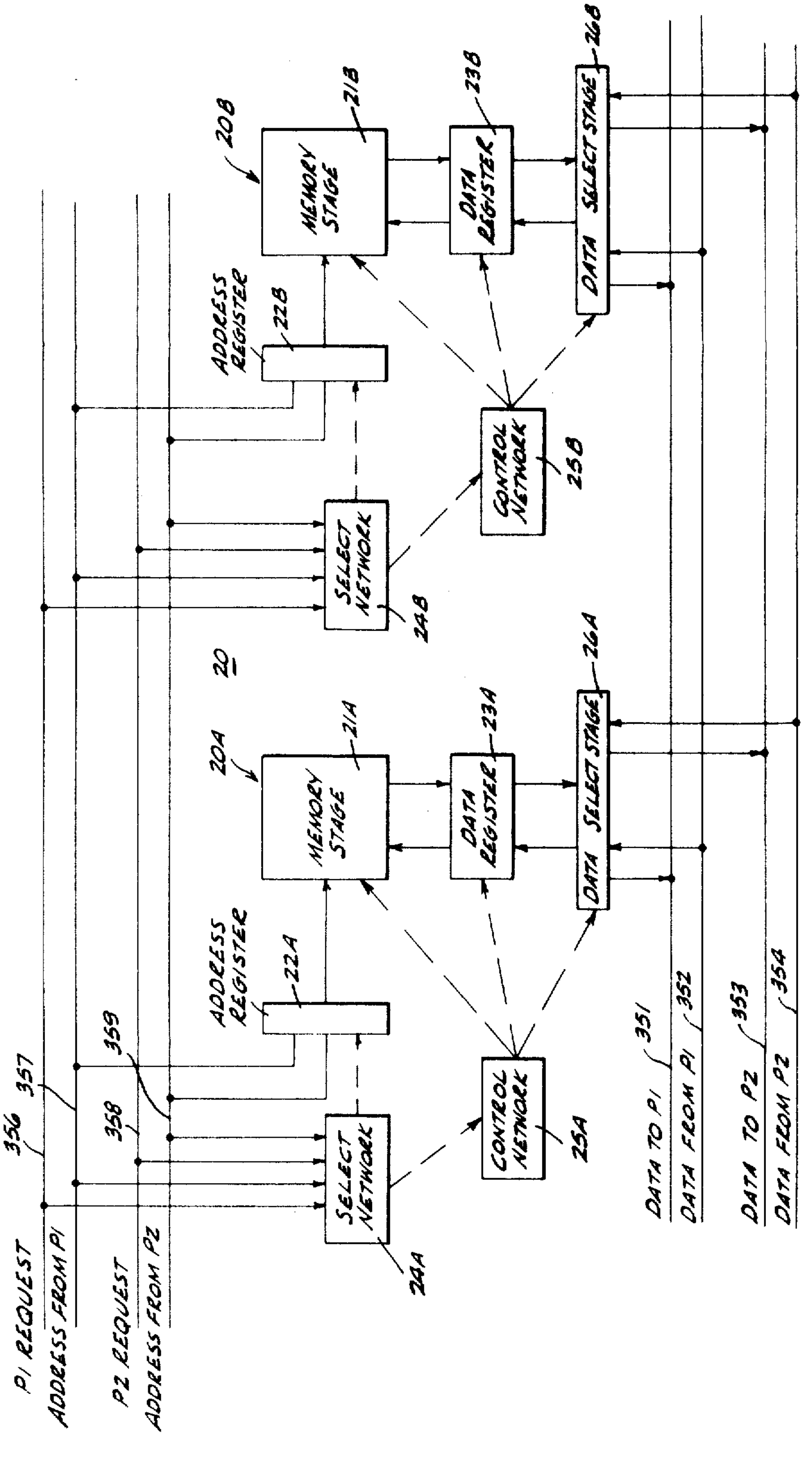
FIGURE 14 is a simplified block diagram showing two processors interconnected with a multibank memory unit.

Reference is now made to FIGURE 14 which is a simplified diagram useful in explaining the interconnection between a plurality of processors such as P1 and P2 to the memory unit 20. In FIGURE 14, the memory unit 20 is shown comprising two memory banks 20A and 20B, each one including an address register 22, a memory stage 21, and a data register 23. The letters A and B are associated with each of the elements of banks 20A and 20B respectively. In addition, each bank includes a select network 24 and a control network 25, as well as a data select stage 26, the function of the latter stage being to interconnect the data register 23 to a plurality of data lines 351 through 354. Lines 351 and 352 are used to interconnect processor P1 to the data select stages with line 351 being used to supply data from the processor P1 through the data select stage 26 to the data register 23 so as to be stored in the memory stage 21. For example, after updating an item of common data, the updated data will be transferred to the memory stage through or by means of line 351. On the other hand, line 352 is used to transfer data to processor P1 from the memory stage. Similarly, lines 353 and 354 are respectively used to receive data from a processor P2 and transfer data thereto. Also lines 356 through 359 are used to interconnect processors P1 and P2 to the select network 24 and address register 22 of each of banks 20A and 20B. Lines 356 and 357 are used to supply signals from processor P1 while lines 358 and 358 are utilized to supply signals from processor P2.

As indicated in FIGURE 14, a request to access the memory by P1 is supplied as signals on line 356 while the location or address of the information desired by processor P1 or to which data should be transferred and stored in a memory, is supplied on line 357, with the latter signals also being supplied to the address register 22. Similarly, lines 358 and 358 are used to supply signals from processor P2, with the signals on line 358 indicating a request for accessing the memory by processor P2 and the signals on line 359 designating the address requested. The select network is interconnected with the control network 25 in order to control the accessing of the memory bank and the proper transfer of information either from the processor to the memory or from the memory to the processor.

The data lines 351 through 354 and address lines 357 and 359 include a plurality of individual leads so that multibit words or data as well as multibit addresses may be supplied therethrough. Also the signals supplied to select network 24 via lines 356 through 358 may comprise more than one lead by means of which one or more bits may be supplied to the select network to control the particular memory bank which is being accessed. For example, out of a complete 15-bit address word, the network 24 may respond to one or two bits in order to select the particular memory bank which is to be accessed This is done by energizing the address register of the particular bank to be accessed. The data select stage 26 of each of the banks may include a plurality of gating arrangements which are controlled by the control network 25 so that data may be transferred from any of the banks (20A, 20B) to either processor P1 or P2, as well as transfer data from either of the processors to either of the banks.

The particular gating arrangements for controlling a plurality of processors to one or more memory banks are not shown, since as is appreciated by those familiar with the art, the arrangements will depend on the particular application. It should also be appreciated that any one of the presently known gating and signal control techniques may be used to provide the necessary interconnections so that a plurality of processors may be connected to the memory unit 20 which may include one or more memory banks as herebefore described.

There has accordingly been shown and described herein a novel interlocked multiprocessor system wherein interlocking circuitry is provided in each of the processors to control the system so as to prevent the simultaneous updating of an item of common data by more than one processor. Briefly, this is accomplished by locking a code associated with an item of common data in the processor prior to transferring the item of common data to the processor. The locking of the code could only be accomplished if none of the other processors have the particular code locked therein. If however, a processor before transferring thereto an item of common data is inhibited from locking the code in its respective lock register, because another of the processors is operating on the particular item of common data at that time, the processor desiring the transfer of common data thereto is in essence locked in a closed loop transfer arrangement within its subroutine to await the completion of the updating operation on the common data by the other processor. At the end of the completion of this operation, the lock register of the other processor is reset, so that the processor desiring the item of common data is able to lock the particular code associated with such item in order to thereafter be able to receive the item of common data for subsequent updating operations.

Although the invention has been described in detail in conjunction with an item of common data which is to be updated, such as the data stored in location X (see FIGURES 3 and 4), it should be appreciated that the teachings are applicable to control the processors with respect to any operational function which each may be required to perform so that a given function is only performed by one processor at any given time. One example of an operational function is accessing an output unit such as an output display or output typewriter. In order to prevent more than one processor from simultaneously accessing the output unit, the operational function of accessing the unit may be associated with a code number which must be locked in the processor before that processor can perform the operational function of accessing the output unit. Therefore, the term item of common data as used herebefore and as used in the appended claims should be interpreted to include any common operational function which more than one processor may be programmed to perform or operate on. When reference is made to operating on an item of common data, it should be assumed to include updating items of common data by performing arithmetic operations thereon, as well as operate in accordance with the item of common data which may be a preselected operational function, one example of which may be performing a particular operation, such as accessing an output unit.

It is appreciated that those familiar with the art may make modifications and changes in the arrangements as shown without departing from the true spirit of the invention. Therefore, all such modifications and/or equivalents are deemed to fall within the scope of the invention as claimed in the appended claims.

What is claimed is:

1. In a multiprocessor system wherein each of a plurality of processors has access to a memory unit to operate on any item of common data stored therein, the improvement comprising:

means for interlocking said plurality of processors so that only one processor operates on an item of common data at a given time, said means including register means and comparing means in each of said processors for storing a code associated with an item of common data to be operated upon and for comparing said stored code with codes contained in the register means of other of said plurality of processors to provide a comparison signal indicative of the relationship of the stored code with the codes in the register means of other of said plurality of processors; and program control means in each processor for responding to the comparison signal provided therein to control the transfer of the item of common data thereto as a function of said comparison signal.

2. A system for interlocking a plurality of processors each one of which has access to a memory unit in which items of common data and codes associated therewith are stored so that at any given time not more than one of said processors may operate on any item of common data the system comprising:

an interlocking stage in each processor, said stage including a lock register for storing a code associated with an item of common data on which the processor is to operate upon, a comparing circuit for comparing the code stored in the lock register of its respective processor with the codes in the lock registers of the other processors to provide a comparison signal of a first level indicative of the absense of comparison between the code stored in said lock register and the codes stored in lock registers of other processors and to provide a comparison signal of a second level when the code stored in said lock register is the same as the code stored in a lock register of another of said processors; and processor program control means responsive to said comparison signal of said first level for energizing said processor to accsess said memory unit to receive the item of common data having its associated code stored in said lock register and to operate on said data therein, said processor program control means being further responsive to the comparison signal of said second level for resetting the lock register in said processor and for accessing the memory unit for a subsequent instruction.

3. The system defined in claim 2 wherein said subsequent instruction is a transfer-back instruction to control said processor to restore the code number of the item of common data in said lock register to be compared again with the codes in the lock registers of the other processors, until none of the lock registers of the other processors stores said code.

4. The system defined in claim 3 wherein said memory unit said transfer-back instruction is preceded by a lock code instruction and followed by a lock item of common data instruction, said processor being operable to skip said transfer-back instruction and proceed to said lock item of common data instruction when said comparison signal is of said first level indicating that none of the lock registers of the other processors contains the same code attempted to be stored in said first processor.

5. In a multiprocessor system wherein each of a plurality of processors is adapted to receive instruction words from a memory unit wherein said instruction words are stored to update data received from the memory unit in accordance with said instruction words and to transfer the updated common data to said memory unit to be stored therein, the data received from the memory unit including items of common data which may be updated by any one of said processors, an interlocking multiprocessor system for controlling said processors so that when one of said processors updates an item of common data the other processors are inhibited from simultaneously operating on the same item the interlocking multiprocessor system comprising:

storage means in each processor for receiving and storing a code associated with an item of common data which said processor is to operate upon before said item of common data is transferred to said processor;

comparing means in each processor associated with the storage means for comparing the code in its associated storage means with the content of the storage means in each of the other processors to provide a negative comparison signal when none of the other storage means stores the code stored in its associated storage means, said comparing means providing a positive comparison signal when the code stored in its associated storage means is stored in the storage means of any other processor; and program control means in each processor for controlling the transfer of an item of common data associated with the code stored in the storage means of the processor when the comparing means thereof provides said negative comparison signal and for inhibiting the transfer of the item of common data to the processor when the comparing means thereof provides said positive comparison signal.

6. The interlocking system defined in claim 5 wherein said storage means is a multibit lock register, each processor further including a lock-register-resetting circuit responsive to said positive comparison signal to reset said lock register, the program control means in each processor including gating means responsive to said positive comparison signal for inhibiting said processor from receiving the item of common data on which said processor is to operate, until the comparing means thereof provides said negative comparison signal.

7. The system defined in claim 6 wherein said memory unit stores program subroutines at least one of said subroutines including a plurality of instruction words consecutively stored in addresses of said memory unit, a first of said instruction words representing the instruction to transfer an item of common data D located at an address X and a second of said instruction words preceding said first word representing the instruction to store a code $C_D$ associated with the item of common data D in the lock register of the processor.

8. The interlocking system defined in claim 5 wherein said storage means is a multibit lock register, each processor further including a lock-register-resetting circuit responsive to said positive comparison signal to reset said lock register, the program control means in each processor including gating means responsive to said positive comparison signal for controlling said processor to repeatedly receive the code associated with the item of common data on which said processor is to operate upon and store said code in the storage means of said processor until the comparing means thereof provides said negative comparison signal.

9. The system defined in claim 8 wherein said memory unit stores program subroutines at least one of said subroutines including a plurality of instruction words consecutively stored in addresses of said memory unit, one instruction word representing the instruction to transfer an item of common data D located at an address X being preceded by a transfer-back instruction word which is preceded by a lock code $C_D$ instruction word, for storing the code $C_D$ associated with common data D in the lock register of the processor receiving said lock code $C_D$ instruction word.

10. A multiprocessor system comprising:

a memory unit including a memory stage for storing data in a plurality of addresses;

a plurality of processors each including means for requesting and receiving data from specific addresses in said memory unit, means for operating on said data in accordance with instruction contained therein, said data including items of coded common data;

decoding and storing means included in each processor for decoding and storing the code of an item of common data to be operated upon in the corresponding processor;

interlocking means including comparing means in each processor for determining whether the code stored in its corresponding processor is stored in any other of said processors and providing comparison signals in accordance therewith; and program control means in each processor for controlling the transfer of the coded item of common data from said memory stage to its corresponding processor as a function of said comparison signals.

11. The system defined in claim 10 wherein the data stored in said memory stage includes instruction words arranged to comprise subroutines with each subroutine including a group of instruction words sequentially stored in addresses, each instruction word including decodable bits for controlling the operation of the processor receiving said instruction word, at least one of said subroutines including a transfer-item-of-common-data instruction word stored in a first address, and an instruction word for locking the code associated with the item of common data stored at said first address, said subroutine further including a last instruction word for unlocking the code stored in the storing means of said processor.

12. The system defined in claim 10 wherein the data stored in said memory stage includes instruction words arranged to comprise subroutines with each subroutine including a group of instruction words sequentially stored in addresses, each instruction word including decodable bits for controlling the operation of the processor receiving said instruction word, at least one of said subroutines including a transfer-item-of-common-data instruction word stored in an address W+2 and a lock-code-of-the-following-item of common data instruction word stored in address W and a transfer-to-address W instruction stored in address W+1.

13. The system defined in claim 12 wherein in each processor in response to the instruction stored in address W said decoding and storing means stores the code of the item of common data in said instruction word, said program control means in each processor being responsive to a comparison signal indicative of the absence of a comparison between the code stored in the storing means of its corresponding processor and codes stored in the storing means of other processors for controlling its corresponding processor to skip the instruction word stored in address W+1 and to request the instruction word in address W+2, said latter word being a transfer-item-of-common-data instruction word, said program control means being further responsive to a comparison signal indicative of the presence of a comparison between the code stored in the storing means of its corresponding processor and a code stored in the storing means of one of the other processors for controlling its corresponding processor to request the next instruction word at address W+1, said instruction word being the transfer to address W.

14. In a multiprocessor system wherein each of a plurality of processors has access to a storage unit to perform a common system function, said unit being responsive to each of said processors and including common function code numbers, the improvement comprising:

first means for storing and comparing said code numbers of said plurality of processors accessing a common system function for control of performance of said common function, said first means developing comparison signals, program control means in each processor, and means responsive to said first means and coupled to said program control means in each processor for interlocking said plurality of processors so that only one processor performs a common system function at any given time.

15. In a multiprocessor system wherein each of a plurality of processors has access to a memory unit to operate on any item of common data stored therein, said data including code words, the improvement comprising:

first means for assigning and comparing said code words for control of said common data;

program control means in each processor;

and second means coupled to said first means and to said program control means for interlocking said plurality of processors so that only one processor operates on an item of common data at a given time.

References Cited

UNITED STATES PATENTS

| | | | |
|---|---|---|---|
| 3,346,851 | 10/1967 | Thornton et al. | 340—172.5 |
| 3,348,210 | 10/1967 | Ochsner | 340—172.5 |

JOHN P. VANDENBURG, Primary Examiner